(12) United States Patent
Gong et al.

(10) Patent No.: US 9,050,937 B2
(45) Date of Patent: Jun. 9, 2015

(54) LOGO DEVICE FOR VEHICLE

(75) Inventors: Qing Gong, Guangdong (CN); Bo Wu, Guangdong (CN); Yilin Zhong, Guangdong (CN); Xinxin Song, Guangdong (CN); Jinqiu Wang, Guangdong (CN); Junming Bai, Guangdong (CN); Jun Dai, Guangdong (CN); Fengwu Su, Guangdong (CN); Ditian Luo, Guangdong (CN)

(73) Assignees: Shenzhen BYD Auto R&D Company Limited, Shenzhen, Guangdong (CN); BYD Company Limited, Shenzhen, Guangdong (CN)

( * ) Notice: Subject to any disclaimer, the term of this patent is extended or adjusted under 35 U.S.C. 154(b) by 360 days.

(21) Appl. No.: 13/569,773

(22) Filed: Aug. 8, 2012

(65) Prior Publication Data

US 2013/0039083 A1 Feb. 14, 2013

(30) Foreign Application Priority Data

Aug. 8, 2011 (CN) ........................ 2011 2 0285750 U
Aug. 29, 2011 (CN) ........................ 2011 2 0318644 U
Dec. 19, 2011 (CN) ......................... 2011 1 0427248

(51) Int. Cl.
*F21V 9/16* (2006.01)
*B60R 13/10* (2006.01)
*B60Q 1/56* (2006.01)

(52) U.S. Cl.
CPC .. *B60R 13/10* (2013.01); *B60Q 1/56* (2013.01)

(58) Field of Classification Search
CPC .................................. B60Q 1/56; B60Q 3/004
USPC .................. 362/602, 511, 481, 482, 487, 495
See application file for complete search history.

(56) References Cited

U.S. PATENT DOCUMENTS 4,941,074 A * 7/1990 DeCosse et al. ............... 362/511
4,977,487 A * 12/1990 Okano ........................... 362/555

(Continued)

FOREIGN PATENT DOCUMENTS

CN 2569278 Y 8/2003
CN 2670175 Y 1/2005

(Continued)

OTHER PUBLICATIONS

PCT International Search Report and Written Opinion dated Aug. 2, 2012 issued in related International Application No. PCT/CN2012/075105 (10 pages).

*Primary Examiner* — Anabel Ton
(74) *Attorney, Agent, or Firm* — Finnegan, Henderson, Farabow, Garrett & Dunner, LLP

(57) ABSTRACT

A logo device for a vehicle is disclosed. The logo device comprises a first shell including a transparent region forming a logo pattern and a nontransparent region and a second shell connected with the first shell. The first shell and the second shell form a sealed cavity therebetween. A bottom plate is disposed in the sealed cavity, and a light guide plate disposed between the bottom plate and the first shell. The light guide plate includes one or more grooves disposed thereon. A circuit board is disposed between the bottom plate and the second shell, including a plurality of illuminating elements thereon. The one or more grooves on the light guide plate receives the plurality of illuminating elements. The light guide plate is configured to direct at least a part of the light generated by the illuminating element toward the transparent region of the first shell.

20 Claims, 4 Drawing Sheets

(56) References Cited

U.S. PATENT DOCUMENTS

| | | | |
|---|---|---|---|
| 5,105,179 A | 4/1992 | Smith | |
| 8,752,989 B2 * | 6/2014 | Roberts et al. | 362/496 |
| 8,780,100 B2 * | 7/2014 | Arheit et al. | 345/207 |
| 2012/0032592 A1 * | 2/2012 | Breunig et al. | 315/77 |

FOREIGN PATENT DOCUMENTS

| | | |
|---|---|---|
| CN | 2809667 Y | 8/2006 |
| CN | 2905560 Y | 5/2007 |
| CN | 101009066 A | 8/2007 |
| CN | 101011952 A | 8/2007 |
| CN | 101344230 A | 1/2009 |
| CN | 101559741 A | 10/2009 |
| CN | 201484317 U | 5/2010 |
| CN | 201792811 U | 4/2011 |
| CN | 201881996 U | 6/2011 |
| CN | 202175002 U | 3/2012 |
| FR | 2879981 A1 | 6/2006 |
| WO | WO 2013/020398 A1 | 2/2013 |

* cited by examiner

LOGO DEVICE FOR VEHICLE

CROSS-REFERENCE TO RELATED APPLICATIONS

This application claims priority to and benefits of Chinese Patent Application No. 201110427248.2, filed on Dec. 19, 2011, Chinese Patent Application No. 201120285750.X, filed on Aug. 8, 2011, and Chinese Patent Application No. 201120318644.7, filed on Aug. 29, 2011, all of which are incorporated herein by reference in their entireties.

FIELD

The present disclosure relates to an improved logo device for a vehicle.

BACKGROUND

A logo device is often attached to the exterior of a vehicle to identify and promote a vehicle brand associated with the vehicle. Conventional logo devices are primarily designed for day-time viewing and identification. During nighttime or when the external illumination is insufficient, however, the conventional logo devices may not be easily and correctly identified by viewers. Although some conventional logo devices may include light-emitting diodes (LEDs) to illuminate patterns on the logo devices, their front covers often have a layer of thin film disposed thereon, causing insufficient reflections during daytime and reducing light emissions during nighttime.

SUMMARY

In some embodiments, a logo device for a vehicle is disclosed. The logo device comprises a first shell including a transparent region forming a logo pattern and a nontransparent region, and a second shell connected with the first shell. The first shell and the second shell form a sealed cavity therebetween. A bottom plate is disposed in the sealed cavity, and a light guide plate disposed between the bottom plate and the first shell. The light guide plate includes one or more grooves disposed thereon. A circuit board is disposed between the bottom plate and the second shell, including a plurality of illuminating elements thereon. The one or more grooves on the light guide plate receives the plurality of illuminating elements. The light guide plate is configured to direct at least a part of the light generated by the illuminating element toward the transparent region of the first shell.

In some alternative embodiments, another logo device for a vehicle is disclosed. The logo device comprises a first shell having a transparent region forming a first logo pattern and a nontransparent region; a second shell connected with the first shell, the first shell and the second shell forming a cavity therebetween; a bottom plate disposed in the cavity; a light guide plate disposed between the bottom plate and the first shell and including one or more grooves thereon; a circuit board disposed between the bottom plate and the second shell; and a plurality of illuminating elements disposed on a surface of the circuit board facing toward the light guide plate. The one or more grooves of the light guide plate receive the illuminating elements.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
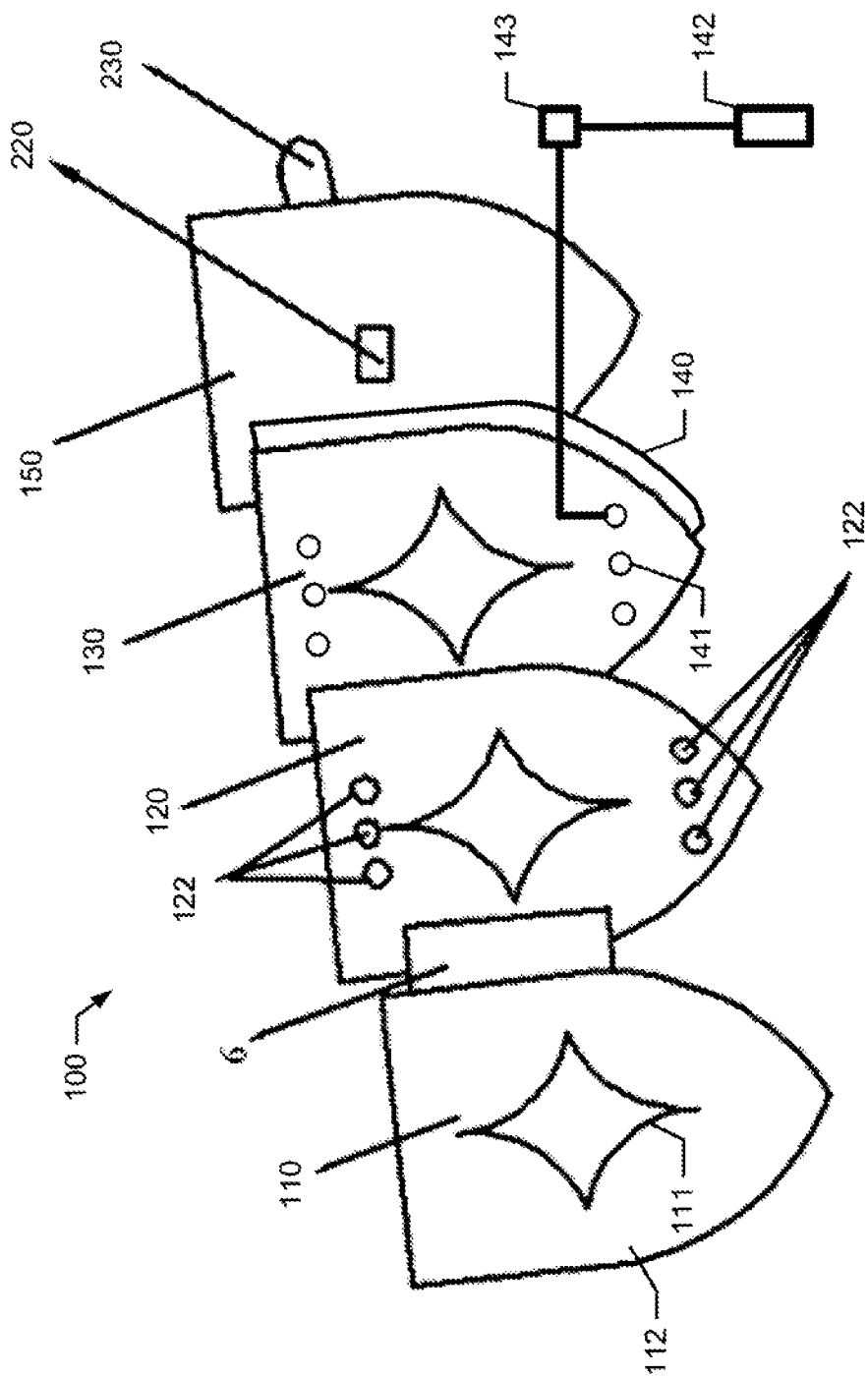
FIG. 1 is an exploded view of a logo device for a vehicle according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

FIG. 1 depicts an exploded view of a logo device 100 for an vehicle according to an embodiment of the present disclosure. Logo device 100 may comprise a first shell 110 and a second shell 150 coupled with the first shell 110. The first shell 110 and the second shell 150 form a cavity, which may be sealed from the external environment. The first shell 110 and the second shell 150 may be plastic and connected with each other using an ultrasound welding technique, thus preventing substances such as air, dusts or water from entering into the cavity of the logo device.

The first shell 100 may further include a transparent region 111, which defines a logo pattern, and a nontransparent region 112. The nontransparent region 112 of the first shell 110 may have a desired color imposed by plating treatments.

A bottom plate 130 is disposed within the sealed cavity formed by the first shell 110 and the second shelf 150. A light guide plate 120 is disposed between the bottom plate 130 and the first shell 110. The light guide plate 120 may be transparent, so that the bottom plate 130 may be viewed through the light guide plate 120. In addition, one or more grooves 122 are disposed on the light guide plate 120.

A circuit board 140 is disposed on the back of the bottom plate 130, including one or more illuminating elements 141 protruding through the bottom plate 130 and facing toward the light guide plate 120. The illuminating elements 141 are aligned with the grooves 122 on the light guide plate 120.

In order to more efficiently illuminate the logo pattern on the first shell 110, a reflective layer is formed on a surface of the bottom plate 130 that faces toward the first shell 110. The reflective layer may be disposed on the bottom plate 130 by physical vapor deposition, electroplating, chemical plating or spray coating etc. The reflective layer may be made from a metal, such as aluminum, silver, or zinc, so that the bottom plate 130 may have a metallic appearance. Alternatively, the bottom plate 130 itself may be a metal plate with a reflective surface. The color of the reflective layer or the reflective surface may be silvery white, blue red, or any other colors.

In a further embodiment, the illuminating elements 141 may include one or more LEDs disposed on the circuit board 140 and electrically connected with the electrical system of the vehicle. A switch may be disposed on a central control board of the vehicle for controlling the LEDs. During daytime or when external light is sufficient, for example, the LEDs may be turned off, so that the logo pattern on the first shell 110 may be rendered with a metallic texture through light reflected from the reflective surface of the bottom plate 130. During nighttime or when the external light is insufficient, the illuminating element 141 may be turned on. Light produced by the illuminating elements 141 is transmitted through the transparent region 111 corresponding to the logo pattern on the first shell 110. As a result, the logo pattern may be observed and identified easily during nighttime or when the environmental illumination is insufficient.

In a further embodiment, a photo-sensing element 142 may also be connected with the electrical system of the vehicle for automatically controlling the illuminating elements 141 based on the external light. In particular, when detecting that the external light is insufficient, the photo-sensing element 142 generates signals to turn on the illuminating elements 141.

In a still further embodiment, the region 111 corresponding to the logo pattern on the first shell 110 may have a flat, depressed, or protruding structure. The depressed or protruding structure may allow the logo device to be rendered with a three-dimensional appearance, thereby further improving the identification and viewing of the logo device 100.

In a still further embodiment, a metal terminal 220 is disposed on the second shell 150. The circuit board 140 is connected to the electrical system of the vehicle through the metal terminal. Additionally, a connector 230 may be disposed on a back surface of the second shell 150 for fixing the logo device onto the vehicle.

Figure 2:
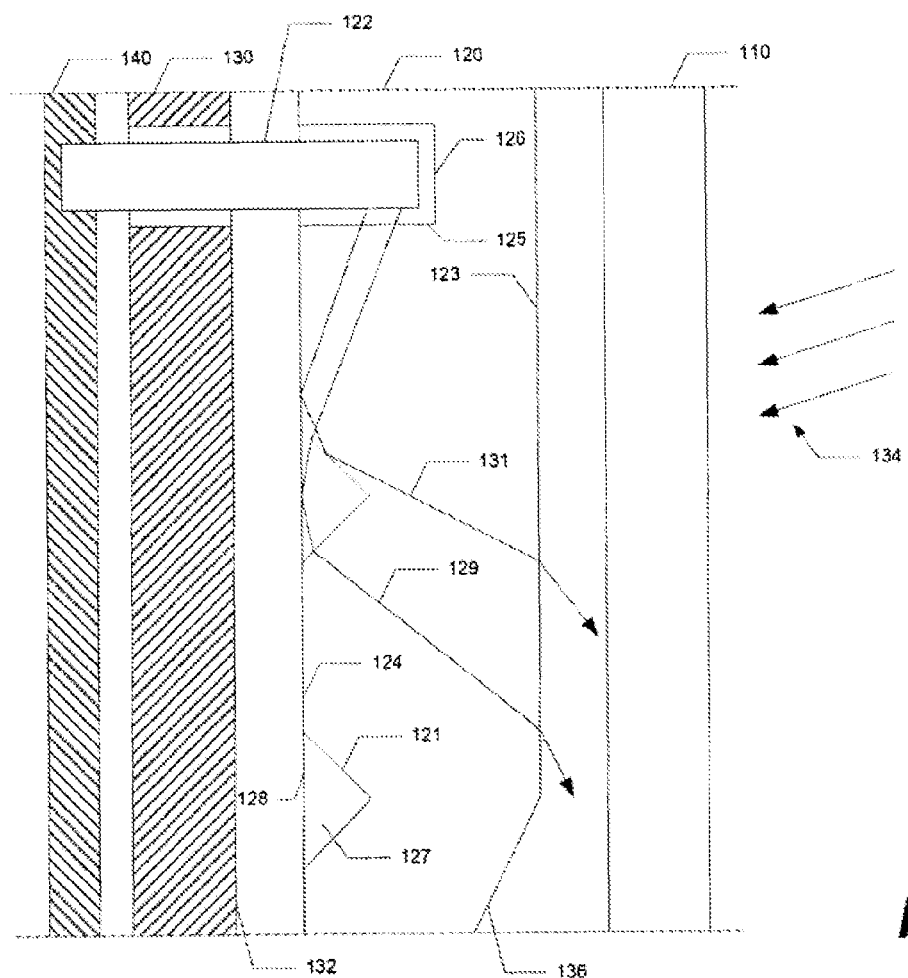
FIG. 2 is a cross-sectional view of the logo device of FIG. 1.

As further shown in FIG. 2, the light guide plate 120 includes a plurality of micro-prism structures 121 disposed therein. The plurality of micro-prism structures 121 are configured to redirect a part of the light emitted by the illuminating elements 141. In particular, the illuminating elements 141 disposed on the circuit board 140 protrude through the bottom plate 130 and are received by the grooves 122 of the light guide plate 120. As a result, light emitted by the illuminating elements 141 enters the light guide plate 120 through a side wall 125 and an end wall 126 of the groove 122. The plurality of micro-prism structures 121 are configured to change the propagation direction of the light in the light guide plate 120 so that the redirected light 129, 131 is transmitted through a face 123 of the light guide plate 120 facing toward the first shell 110. The micro-prism structures 120 may change the direction of the light by way of reflection, such as in redirected light 131, or by way of refraction, such as in redirected light 129. After reflection and refraction, redirected light 129, 231 exits the light guide plate 120 through the face 123, which faces toward the first shell 110.

According to a further embodiment, the plurality of microprism structures 121 are distributed in a region of the light guide plate 120 corresponding to the transparent region 111 of the first shell 110 and on a face 124 of the light guide plate 120 facing toward the bottom plate 130. In addition, the number of the illuminating elements 141 may be varied, while providing sufficient illumination for the logo pattern on the first shell 110.

In some embodiments, each micro-prism structure 121 has a triangular cross section 127 as shown in FIG. 2. A bottom edge 128 of the triangular cross section 127 faces toward the bottom plate 130. The micro-prism structures 121 may have other configurations. For example, each micro-prism structure 121 may also have an arched cross section, a square cross section, a semicircular cross section, etc.

According to a further embodiment, the micro-prism structures 121 may be arranged in predetermined positions, respectively, so that the light may be transmitted through the entire transparent region 111 corresponding the logo pattern of the first shell 110. As a result, the logo pattern on the first shell 110 is illuminated uniformly and rendered clearly to a viewer.

According to a further embodiment, the connection between the second shell 150 and the first shell 110 is sealed, thereby forming a sealed space therebetween and improving the durability of the logo device 100.

According to a still further embodiment, a front face 132 of the bottom plate 130 may be painted with a chosen color. Since the light guide plate 120 is transparent, external light 134 may pass through the transparent region 111 of the first shell 110 and the light guide plate 120, reaching the front face 132 of the bottom plate 130. The external light 134 may then be reflected therefrom and exit the first shell 110 through the transparent region 111 corresponding to the log pattern. As a result, when the environmental illumination is sufficient or the device is exposed to day light, the color of the bottom plate 130 may be presented in the transparent region 111 of the first shell 110. Thus, the transparent region 111 corresponding to the logo pattern of the first shell 110 may be rendered in a desired color. In some embodiments, the front face 132 of the bottom plate 130 may be painted in a metallic color, so that the logo device may reflect a metallic texture.

In another embodiment, the logo pattern formed by the transparent region 111 of the first shell 110 may be illuminated in a low-illumination environment or during nighttime. Specifically, the illuminating elements 141 may be connected to a power source through the circuit board 140 and generate light. The light emitted by the illuminating elements 141 enters the light guide plate 120 through the side wall 125 and the end wall 126 of the groove 122 of the light guide plate 120. Transmission of the light in the light guide plate 120 may be modified by the plurality of micro-prism structures 121, so that the light emitted by the illuminating elements 141 is directed to the first shell 110 through the face 123 of the light guide plate 120. At least a portion of the light then passes through the transparent region 111 of the first shell 110, thereby illuminating the logo pattern. As a result, the logo pattern may be presented to the viewer for identification even when there is insufficient light in the external environment.

In order to further ensure the durability and the robustness of the logo device 100, the connector 230 of the logo device 100 may further comprise a rubber plug disposed in an opening made in the second shell 150. A conductive wire is passed through the rubber plug into the log device 100 and connected to the circuit board 140 so as to provide control signals and electrical power to the illuminating element 141. The rubber plug provides sealing between the conductive wire and the opening in the second shell 150, thereby preventing moisture and dirt from entering the interior of the logo device 100.

In addition, the conductive wire may connect the circuit board 140 with a control switch disposed within the vehicle. An operator or passenger of the vehicle may control the illuminating elements 141 to turn them on or off by utilizing the control switch. For example, during daytime or when the external light is sufficient, the illuminating elements 141 may be turned off. Through the reflection of the external light, as described above, the logo pattern formed by the transparent region 111 of the first shell 110 presents the color and texture of the bottom plate 130. During nighttime or when the external light is insufficient, the illuminating elements 141 may be turned on by the driver by using the control switch, the light emitted by the illuminating element 141 is directed by the plurality of micro-prism structures 121 of the light guide plate 120 toward the first shell 110.

Alternatively, the illuminating element 141 may be automatically turned on or off by a controller 143 according to signals from the photo-sensing element 142. Particularly, the sensing element 142 may detect a change in the environmental illumination. The controller 143 is connected with the sensing element 142 and the illuminating element 141 respectively, and configured to turn on the illuminating element 141, when the environmental illumination detected by the sensing element 142 is less than a threshold and to turn off the illuminating element 141, when the environmental illumination detected by the sensing element is greater than the threshold. The threshold may be preset or determined empirically. Alternatively, the sensing element 142 may be affixed to the exterior of the car or placed within the car near a window so that the sensing element 142 can effectively detect the environmental illumination. The controller 143 may be disposed on the circuit board 140 and be part of the control circuit for the logo device 100. Alternatively, the controller 143 may be part of the control system of the vehicle. The controller 143 may be an integrated circuit chip or microprocessor, which may be programmed to provide the control functions described herein.

In some embodiments, a shading film 6 may be disposed between the light guide plate 120 and the first shell 110 for filtering out light that is not refracted or reflected by the light guide plate 120 but transmitted directly from the transparent region 111 of the first shell 110 after emitted by the illuminating element 141. As such, irritation to eyes as a result of direct illumination by the illuminating element 141 may be prevented.

In still another embodiment, the light guide plate 120 is made from an anti-ultraviolet material, thus reducing the aging of the light guide plate 120 due to ultraviolet irradiation and further enhancing the reliability of the logo device 100. The present disclosure is not limited hereto. For example, the light guide plate 120 may also be made from a polycarbonate material.

In addition, an outer edge of the first shell 110 may have a transparent region, and an edge region of the light guide plate 120 may include an inclined surface 136 (FIG. 2). The inclined surface 136 of the light guide plate 120 may provide additional refraction. As such, when the illuminating element 141 is turned on, an illuminated frame is rendered around the illuminated pattern of the logo device, thereby improving the three-dimensional appearance of the logo device.

In additional embodiments, the light guide plate 120 and the micro-prism structure 121 are integrally formed by injection molding. Alternatively, the plurality of micro-prism structures 121 may be formed on the light guide plate 120 by hot press molding. As such, the light guide plate 120 has superior optical transmittance.

The bottom plate 130 may be formed by a plastic plate or modeling materials with a metallic film layer. Particularly, the metallic film layer may be formed by physical vapor deposition (PVD), electroplating, chemical plating, spray coating, etc. As such, the metallic film layer is even and flat and provide superior reflection of light. Further, the metallic film layer may be formed using a metal, such as aluminum, silver, or zinc, so that the surface of the bottom plate 130 may have a metal background color. Additionally, the metallic background color provided by the metallic film layer may be made, for example, silver, white, blue, or red, according to the requirement of the user or the vehicle manufacturer. The bottom plate 130 itself may also be a metal plate, such as a copper plate or an aluminum plate, and has a flat surface to provide sufficient reflection of light.

By incorporating the first shell 110 and the bottom plate 130, the logo device 100 provides an appearance of a metal texture when the environmental illumination is sufficient or during daytime. When the environmental illumination is insufficient or during nighttime, the illuminating elements 141 may be turned on to generate light, which passes through the first shell 110 and the light guide plate 120, thereby illuminating the logo pattern on the first shell 110. As such, the logo device 100 may be used as an illuminated logo, providing an attractive appearance and improving identification. As such, the logo device 100 has a compact structure, providing energy saving, environmental protection, low cost, and convenience.

Figure 3:
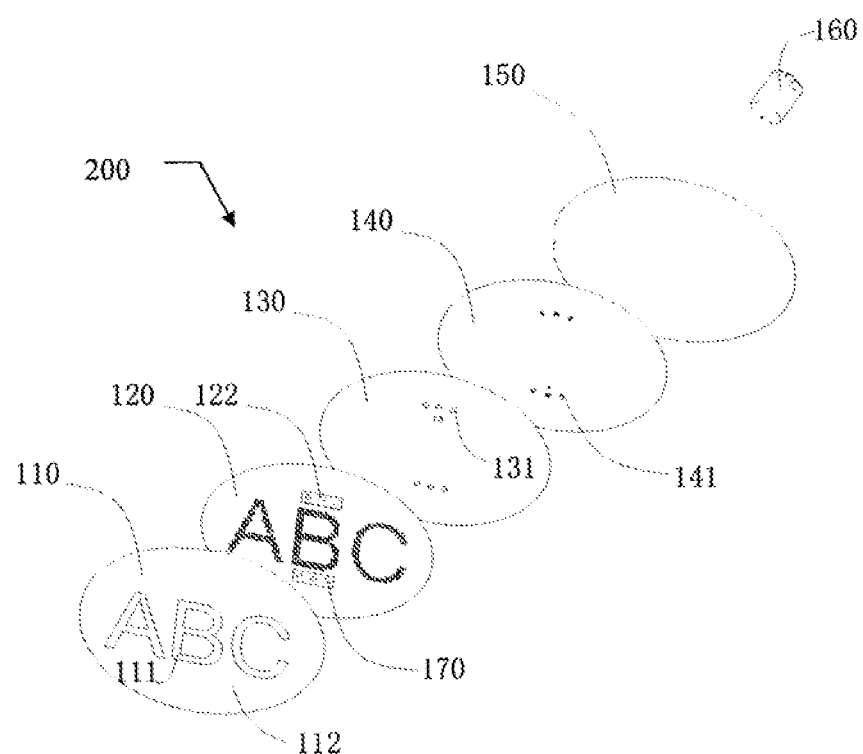
FIG. 3 is an exploded view of a logo device for a vehicle according to another embodiment of the present disclosure.

FIG. 3 depicts an exploded view of a logo device 200 for a vehicle according to another embodiment. Similar to logo device 100, the logo device 200 includes a first shell 110, a second shell 150, a light guide plate 120, a bottom plate 130, and a circuit board 140. The first shell 110 and the second shell 150 form a sealed space therebetween. The first shell 110 has a transparent region 111 forming a logo pattern and a nontransparent region 112. As such, the transparent region 111 defines the first logo pattern reflecting, for example, letters "ABC," as shown in FIG. 3. The nontransparent region 112 may include a layer of color film disposed thereon to prevent light transmission therethrough. The logo pattern may be defined according to a customer's need to reflect the characteristics of a brand associated with the vehicle. The nontransparent region 112 may have any color.

As further shown in FIG. 3, the light guide plate 120 is disposed behind the first shell 110, the bottom plate 130 is disposed behind the light guide plate 120, and the circuit board 140 is disposed behind the bottom plate 130. The light guide plate 120 includes a plurality of receiving grooves 122 and 170 disposed on a back face of the light guide plate 120.

The bottom plate 130 includes a plurality of via holes 131 aligned with the respective receiving grooves 122 and 170. According to one embodiment, as shown in FIG. 3, six via holes 131 are formed in the bottom plate 130. In other embodiments, the number of the via holes 131 is not limited hereto, and the position, the shape, and the number of the via holes 131 may be made according to the shape of the logo pattern formed on the first plate 110.

The circuit board 140 is disposed behind the bottom plate 130 and includes a plurality of illuminating elements 141 aligned with the via holes 131 of the bottom plate 130. When the circuit board 140 is installed, the illuminating elements 141 protrude through the respective via holes 131 of the bottom plate 130 and are received by grooves 122 and 170 of the light guide plate 120.

According to one embodiment, the illuminating elements 141 include one or more LEDs. The LED provides energy saving and long service life, and consequently may prolong the illuminating time of the logo device and improve the overall quality of the logo device 200.

The second shell 150 is disposed behind the circuit board 140 and connected with the first shell 110 to form a sealed space therebetween. The light guide plate 120, the bottom plate 130, and the circuit board 140 are disposed within the sealed space. The second shell 150 may be connected with the first shell 110 by, for example, ultrasonic welding. Therefore, a sealing element may be omitted and the cost may be reduced, while the sealing effect may be enhanced.

The circuit board 140 and the illuminating elements 141 disposed thereon may be connected with the electrical system of the vehicle through a conductive wire passing through a plug device 160. The plug device 160 may be disposed in an opening made on the second shell 150 and provide sealing between the conductive wire and the second shell 150.

Similar to logo device 100, logo device 200 may provide improved identification of the logo pattern on the first shell 110 in all illumination conditions. For example, during daytime or when the external illumination is sufficient, the illuminating elements 141 may be turned off, so that the logo pattern on the first shell 110 is rendered through the light reflected by the bottom plate 130. The logo pattern may be rendered in the color and texture of the bottom plate 130. During nighttime or when the external illumination is insufficient, the illuminating elements 141 may be turned on, so that the logo pattern on the first shell 110 may be rendered through the light generated by the illuminating elements 141. The light generated by the illuminating elements 141 is transmitted through the light guide pate 120, as shown in FIG. 2, which has a plurality of micro-prism structures 121 disposed thereon. The micro-prism structures 121 direct the light generated by the illuminating elements 141 toward the first shell 110 though refraction and reflection as discussed above.

In a still further embodiment, a shading film may be disposed between the first shell 110 and the light guide plate 120 to filter out the part of the light transmitted directly from the illuminating elements 141, thereby improving the uniformity of the rendering of the logo pattern.

Figure 4:
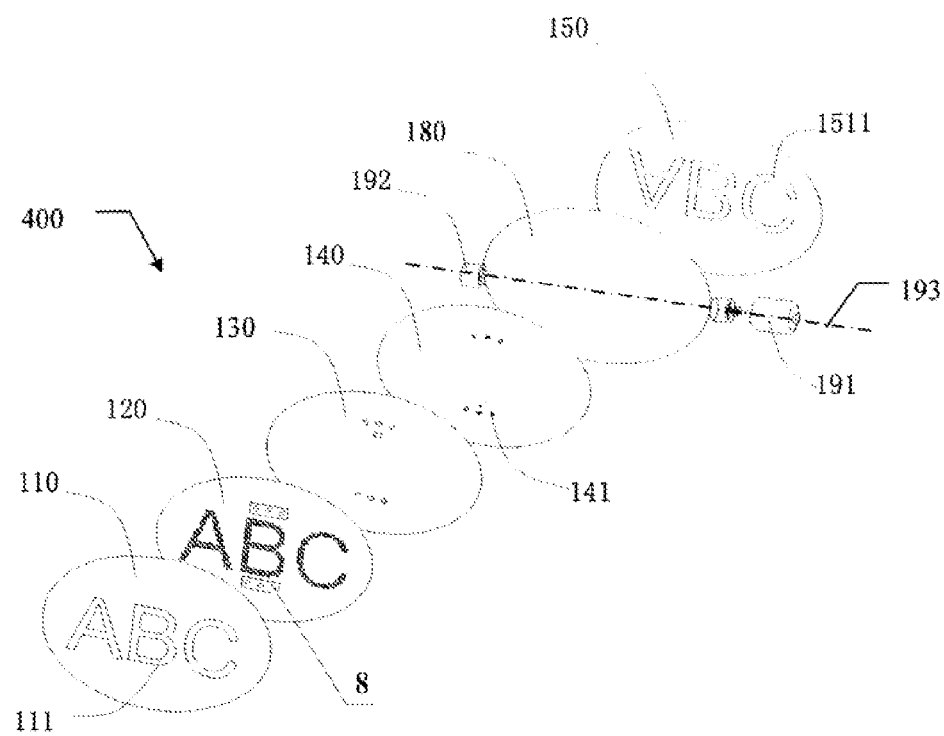
FIG. 4 is an exploded view of a logo device for a vehicle according to still another embodiment of the present disclosure.

FIG. 4 depicts another exemplary log device 400. The logo device 400 includes a first shell 110, a second shell 150, a light guide plate 120, a support member 180, a circuit board 140, and a bottom plate 130. The circuit board 140 is disposed between the support member 180 and the light guide plate 120, while the bottom plate 130 is disposed between the light guide plate 120 and the circuit board 140. The bottom plate 130 may be opaque so as to prevent light from passing through.

The first shell 110 and the second shell 150 may each be plastic. An outer surface of the first shell 110 includes a first logo pattern defined by a transparent region 111 of the first shell 110. The remaining region of the first shell 110 may be opaque and has one or more colors. An outer surface of the second shell 150 is surface treated and thus reflects external light directed thereon. In addition, the outer surface of the second shell 150 has a second logo pattern 1511 disposed thereon. Thus, the second shell 150 provides easy identification by observers during daytime.

As further shown in FIG. 4, the first logo pattern 111 (i.e., the transparent region 111 on the first shell 110) and the second logo pattern 1511 have substantially identical shapes and are symmetrically distributed with respect to a horizontal axis 193. As a result, when the second logo pattern 1511 is rotated by 180 degrees around the vertical axis 193, the regions of the first log pattern 111 and the second log pattern 1511 substantially overlap each other.

According to a further embodiment, the support member 180 may be a plastic plate, including a pair of shafts 191 and 192, disposed along a horizontal direction at opposing ends of the support member 180. In addition, the shaft 191 may have a motor (not shown) attached thereto and cause support member 180 to rotate. The shaft 192 may position the support member 180 at a given position when the motor attached to the shaft 191 stops. The motor may be a step motor, which provides accurate positioning of the logo device 400. An opening may be formed at a center of an end face of the shaft 192, so that the circuit board 140 inside the logo device 400 may be connected with the electrical system of the vehicle via a conductive wire through the opening.

Similar to logo device 100 of FIG. 1, a plurality of illumination elements 141 are disposed on the circuit board 140 for producing light. In addition, the light guide plate 120 has one or more grooves 122 made thereon corresponding to the illumination elements 141. When the logo device 400 is assembled, the grooves 122 of the light guide plate 120 receive the illuminating elements 141 protruding through the bottom plate 130. The light produced by illuminating elements 141 enters the light guide plate 120, which then transmits the light toward first shell 111 through reflection and refraction. In a still further embodiment, a shading film may be disposed between the first shell 110 and the light guide plate 120 to filter out the part of the light transmitted directly from the illuminating elements 141, thereby improving the uniformity of the rendering of the logo pattern.

As shown in FIG. 2, the light guide plate 120 has a plurality of micro-prism structures disposed therein and are distributed in a region generally corresponding to the transparent region 111 of the first shell 110. According to a further embodiment, the region corresponding to the micro-prism structures is slightly greater than the transparent region 111 corresponding to the first logo pattern.

According to a further embodiment, the logo device 400 may be rotated by 180° in a horizontal direction. Specifically, during daytime or when the environmental illumination is sufficient, the logo device 400 is rotated and positioned so that the second shell 150 is exposed to the environmental illumination. Thus, the second logo pattern 1511 is rendered through reflection by the exterior surface of the second shell 150.

During nighttime or when the environmental illumination is insufficient, the logo device 400 is rotated about the horizontal axis 193 by 180 degrees, so that the first shell 110 is exposed. When connected to an electrical source, the illuminating elements 141 produce light, which is reflected or refracted by the light guide plate 120, thereby illuminating the first logo pattern on the first shell 110. Thus, the first logo pattern may be identified easily in a low-illumination condition.

Figure 5:
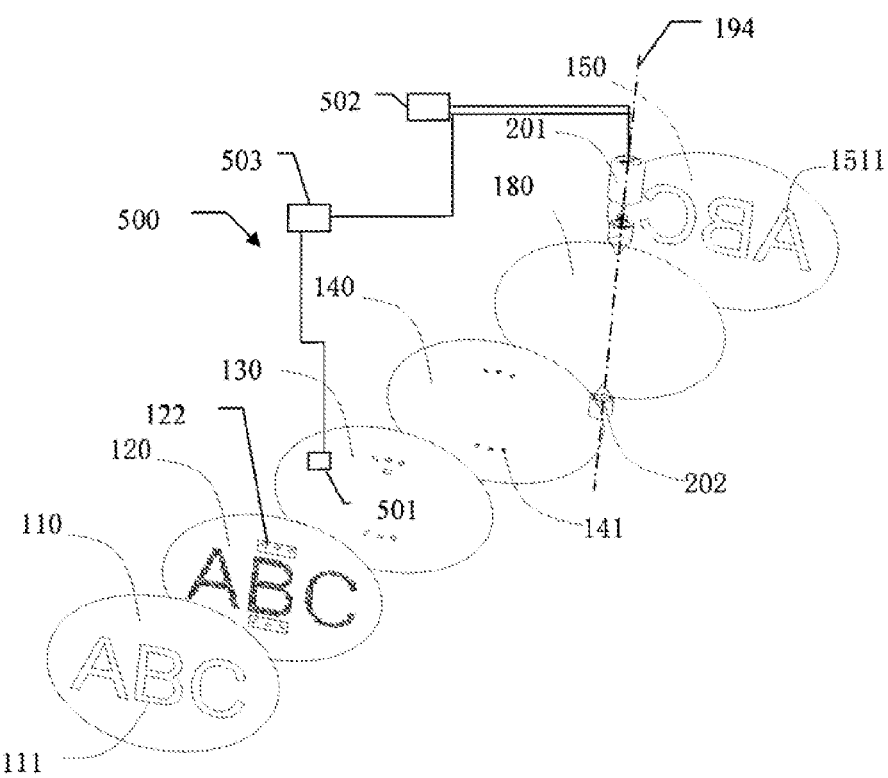
FIG. 5 is an exploded view of a logo device for a vehicle according to yet another embodiment of the present disclosure.

FIG. 5 depicts an exemplary logo device 500 according to another embodiment. The logo device 500 is similar to the logo device 400 of FIG. 4, except that the logo device 500 may be rotated about a vertical axis 194. In particular, the first logo pattern 111 on the first shell 110 and the second logo pattern 1511 on the second shell 150 have substantially identical shapes and are symmetrically disposed with respect to the vertical axis 194.

In one embodiment, as shown in FIG. 5, a vertical rotating device for rotating the logo device 500 about the vertical axis 194 is disposed on the support member 180. The vertical rotating device comprises a first shaft 201 and a second shaft 202 arranged in the vertical direction along the vertical axis 194, which is a geometrical centerline of support member 180. The first shaft 201 is disposed at a first end of the support member 180 for driving the logo device to rotate about the vertical axis 194, while the second shaft 202 is disposed at the opposing end of the support member 180 for positioning the logo device 500 at a given position when the rotation stops.

According to a further embodiment, during daytime or when external light is sufficient, the logo device 500 may be rotated so that the second shell 150 is exposed to the environmental illumination. Thus, the logo device 500 has an appearance of the second shell 150, which displays the logo pattern 1511 by reflecting the external light. During nighttime or when the external light is insufficient, the logo device 500 is rotated by, for example, 180 degrees so that the first shell 110 is exposed. In addition, the illuminating elements 141 disposed on the circuit board 140 are turned on so that the first logo pattern 111 on the first shell 110 may be illuminated by the illuminating elements 141. The light generated by the illuminating elements 141 is transmitted through the light guide plate 120, as described above in connection with FIG. 2. As a result, the logo device 500 may be identified easily when the external light is insufficient.

In one embodiment, the bottom plate 130 disposed between the light guide plate 120 and the circuit board 140 increases the efficiency and uniformity of the light generated by the illuminating elements 141. In some embodiments, the bottom plate 130 may be a plastic plate having a reflective surface formed by surface plating, or may be a reflective plate having a smooth flat surface.

In a further embodiment, one or more photo-sensing elements 501 may be connected with the electrical system of the vehicle. The photo-sensing elements 501 may detect the external illumination condition and provide signals to a controller 503 for automatically rotating the logo device 500 according to the external illumination. For example, during daytime, the photo-sensing elements 501 detects that the external illumination is sufficient and thus may generate signals controller 503, which then instructs the motor coupled to the drive shaft 201 to rotate the logo device 500 so that the second shell 150 faces outwards. During nighttime or when the external illumination is insufficient, the photo-sensing elements 501 detects that the external illumination is insufficient and thus may generate signals to the controller 503, which may instruct the drive shaft 201 to rotate the logo device 500 so that the first shell 110 is exposed and illuminated. Alternatively, the photo-sensing element 501 may be disposed within or outside of the vehicle for detecting the illumination condition.

In some embodiments, a control switch 502 may be disposed inside the passenger compartment of the vehicle on a central control board. The control switch 502 allows a driver or other passengers to control the illumination elements 141 and the rotation of the logo device 500.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A logo device for a vehicle, comprising:
   a first shell including a transparent region forming a logo pattern and a nontransparent region;
   a second shell connected with the first shell, the first shell and the second shell forming a sealed cavity therebetween;
   a bottom plate disposed in the sealed cavity;
   a light guide plate disposed between the bottom plate and the first shell, the light guide plate including one or more grooves disposed thereon;
   a circuit board disposed between the bottom plate and the second shell; and
   a plurality of illuminating elements disposed on a face of the circuit board facing toward the light guide plate, the illuminating elements being configured to generate light for illuminating the first shell;
   wherein the one or more grooves on the light guide plate receives the plurality of illuminating elements, and the light guide plate is further configured to direct at least a part of the light generated by the illuminating element toward the transparent region of the first shell.

2. The logo device according to claim 1, wherein the light guide plate includes a plurality of micro-prism structures disposed on a surface of the light guide plate facing toward the bottom plate, and has a triangular cross section in a plane parallel with a lateral side of the light guide plate, the triangular cross section having a bottom edge facing toward the bottom plate, the micro-prism structures being configured to direct at least the part of the light generated by the illuminating element toward the transparent region of the first shell.

3. The logo device according to claim 2, wherein the micro-prism structures and the light guide plate are integrally formed by injection molding or hot press molding.

4. The logo device according to claim 1, wherein the light guide plate is made from an anti-UV material.

5. The logo device according to claim 1, wherein the illuminating elements are light emitting diodes.

6. The logo device according to claim 1, wherein the light guide plate further includes an inclined plane in an edge region thereof, the inclined plane being configured to direct a part of the light generated by the illuminating elements toward an edge of the logo device.

7. The logo device according to claim 1, wherein the bottom plate is a metal plate or a plate having a metal layer disposed thereon.

8. The logo device according to claim 1, further comprising:
   a sensing element for detecting an environmental illumination; and
   a controller for controlling the illuminating elements according to the illumination detected by the sensing element.

9. The logo device according to claim 1, further comprising:
   a shading film disposed between the light guide plate and the first shell for filtering out a part of the light generated by the illuminating elements that are not refracted by the light guide plate.

10. The logo device according to claim 1, wherein a connection between the first shell and the second shell is sealed by ultrasonic welding and the cavity formed by the first shell and the second shell is airtight.

11. The logo device according to claim 1, further comprising:
    a rubber plug embedded in the second shell; and
    a conductive wire protruding through the rubber plug and connected with the circuit board.

12. A logo device for a vehicle, comprising:
    a first shell having a transparent region forming a first logo pattern and a nontransparent region;
    a second shell connected with the first shell, the first shell and the second shell forming a cavity therebetween;
    a bottom plate disposed in the cavity;
    a light guide plate disposed between the bottom plate and the first shell and including one or more grooves thereon;
    a circuit board disposed between the bottom plate and the second shell; and
    a plurality of illuminating elements disposed on a surface of the circuit board facing toward the light guide plate, wherein the one or more grooves of the light guide plate receive the illuminating elements.

13. The logo device according to claim 12, wherein the metal layer is formed on a surface of the bottom plate facing toward the first shell and is formed by at least one of physical vapor deposition, electroplating, chemical plating or spray coating.

14. The logo device according to claim 12, wherein the light guide plate further includes a plurality of micro-prism structures, the micro-prism structures being distributed in a region of the light guide plate corresponding to the transparent region of the first shell and larger than the transparent region of the first shell.

15. The logo device according to claim 12, further comprising a support member disposed between the circuit board and the second shell, wherein the second shell includes a second logo pattern disposed thereon, the first logo pattern and the second logo pattern having substantially identical shapes and being positioned symmetrically with respect to an axis of the support member.

16. The logo device according to claim 15, further comprising:
 a rotating device disposed on the support member along an axis of the support member for rotating the logo device around the axis; and
 the rotating device further comprises:
  a first shaft disposed on one end of the support member for rotating the logo device around the axis; and
  a second shaft disposed on an opposing end of the support member for positioning the logo device.

17. The logo device according to claim 12, further comprising a shading film disposed between the light guide plate and the first shell configured to filter out light not refracted or reflected by the light guide plate.

18. The logo device according to claim 12, wherein a photo-sensing element connected with an electrical system of the vehicle, the photo-sensing element being configured to detect an environmental illumination; and
 a controller is disposed on the circuit board for receiving signals from the photo-sensing element reflecting the environmental illumination and controlling the logo device in accordance with the signals.

19. The logo device according to claim 18, wherein the controller is configured to turn on the illuminating elements when the environmental illumination is less than a threshold.

20. The logo device according to claim 18, wherein the controller is configured to instruct the rotating device to rotate the logo device to expose the first logo pattern of the first shell when the environmental illumination is less than a threshold.

* * * * *